(12) United States Patent
Gokhale et al.

(10) Patent No.: US 11,968,210 B2
(45) Date of Patent: *Apr. 23, 2024

(54) MANAGEMENT OF ACCESS CONTROL IN MULTI-CLOUD ENVIRONMENTS

(71) Applicant: International Business Machines Corporation, Armonk, NY (US)

(72) Inventors: Amey Gokhale, Pune (IN); Dileep Dixith, Hyderabad (IN); Abhishek Jain, Baraut (IN); Subramaniyan Nallasivam, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 344 days.

This patent is subject to a terminal disclaimer.

(21) Appl. No.: 17/324,209

(22) Filed: May 19, 2021

(65) Prior Publication Data

US 2022/0377077 A1 Nov. 24, 2022

(51) Int. Cl.
*H04L 9/40* (2022.01)
*G06F 16/11* (2019.01)
*G06F 16/14* (2019.01)
*G06F 16/182* (2019.01)

(52) U.S. Cl.
CPC .......... *H04L 63/101* (2013.01); *G06F 16/119* (2019.01); *G06F 16/148* (2019.01); *G06F 16/1824* (2019.01); *H04L 63/104* (2013.01)

(58) Field of Classification Search
None
See application file for complete search history.

(56) References Cited

U.S. PATENT DOCUMENTS

| 8,769,622 | B2 | 7/2014 | Chang et al. | |
|---|---|---|---|---|
| 10,089,187 | B1 * | 10/2018 | Pecoraro | H04L 67/1097 |
| 10,129,024 | B2 * | 11/2018 | Stuntebeck | G06F 16/13 |
| 10,185,727 | B1 * | 1/2019 | Wilton | G06F 16/214 |
| 10,305,909 | B2 | 5/2019 | Horii et al. | |
| 10,348,767 | B1 * | 7/2019 | Lee | H04L 63/0236 |
| 10,404,716 | B2 | 9/2019 | Walstad et al. | |
| 10,834,137 | B2 | 11/2020 | Pitre et al. | |
| 11,330,081 | B1 * | 5/2022 | Fellers | H04L 41/0886 |
| 11,336,650 | B1 * | 5/2022 | Dargude | G06F 3/067 |

(Continued)

OTHER PUBLICATIONS

"IBM Spectrum Scale", IBM Systems, Data Sheet, Nov. 2017, 6 pages. https://www.ibm.com/downloads/cas/GQN4XN15.

(Continued)

*Primary Examiner* — Michael W Chao
(74) *Attorney, Agent, or Firm* — Daniel M. Yeates

(57) ABSTRACT

A computer-implemented to control access to data on an off-premises storage system. The method includes defining an access policy for a plurality of files in a file system stored in an on-premises storage system. The method further includes registering the access policy with a first off-premises storage system. The method also includes creating a resource-based cloud access policy based on an on-premise access policy. The method includes determining a set of files from the plurality of files to migrate to the off-premises storage. The method also includes obtaining, for the set of files, an access policy as access metadata. The method further includes migrating the set of files and the access metadata to the off-premises storage.

20 Claims, 6 Drawing Sheets

(56) References Cited

U.S. PATENT DOCUMENTS

| | | | | |
|---|---|---|---|---|
| 11,568,073 | B2* | 1/2023 | Nair | G06F 16/192 |
| 11,656,951 | B2* | 5/2023 | Bhagi | G06F 11/2028 |
| | | | | 707/654 |
| 11,689,629 | B2* | 6/2023 | Sutardja | H04L 63/104 |
| | | | | 726/4 |
| 11,716,288 | B2* | 8/2023 | Byers | H04L 47/83 |
| | | | | 709/225 |
| 11,726,953 | B2* | 8/2023 | Dixith | G06F 16/178 |
| | | | | 707/610 |
| 11,741,254 | B2* | 8/2023 | Teich | H04L 63/101 |
| | | | | 726/28 |
| 11,770,372 | B2* | 9/2023 | Tripp | H04L 63/20 |
| | | | | 726/8 |
| 2012/0239739 | A1* | 9/2012 | Manglik | G06F 8/61 |
| | | | | 709/203 |
| 2012/0297016 | A1* | 11/2012 | Iyer | H04L 43/06 |
| | | | | 709/217 |
| 2014/0289791 | A1* | 9/2014 | Acharya | H04L 63/0236 |
| | | | | 726/1 |
| 2015/0046971 | A1* | 2/2015 | Huh | H04L 9/3213 |
| | | | | 726/1 |
| 2015/0188992 | A1* | 7/2015 | Ayanam | H04L 67/125 |
| | | | | 709/203 |
| 2015/0370845 | A1* | 12/2015 | Haustein | G06F 16/119 |
| | | | | 707/690 |
| 2017/0097818 | A1* | 4/2017 | Heine | H04L 67/34 |
| 2017/0104639 | A1* | 4/2017 | Jiang | H04L 67/01 |
| 2017/0104755 | A1* | 4/2017 | Arregoces | H04L 67/10 |
| 2017/0220605 | A1* | 8/2017 | Nivala | G06F 16/282 |
| 2017/0255417 | A1* | 9/2017 | Dain | G06F 16/1744 |
| 2019/0007415 | A1* | 1/2019 | Kliger | H04L 63/104 |
| 2019/0052643 | A1* | 2/2019 | Doshi | G06N 5/04 |
| 2019/0114203 | A1* | 4/2019 | James | H04L 41/0889 |
| 2019/0123972 | A1* | 4/2019 | Parandehgheibi | H04L 41/145 |
| 2019/0199750 | A1* | 6/2019 | Chen | H04L 41/22 |
| 2019/0296978 | A1* | 9/2019 | Seshadri | G06F 9/5072 |
| 2020/0162467 | A1 | 5/2020 | Panse et al. | |
| 2020/0278813 | A1* | 9/2020 | Nilsson | G06F 3/0604 |
| 2020/0356536 | A1* | 11/2020 | Nilsson | G06F 16/122 |
| 2020/0389502 | A1 | 12/2020 | Kung et al. | |
| 2021/0064347 | A1* | 3/2021 | Junior | G06F 8/30 |
| 2021/0097020 | A1* | 4/2021 | Chatterjee | G06F 16/1824 |
| 2021/0336966 | A1* | 10/2021 | Gujarathi | H04L 9/3247 |

OTHER PUBLICATIONS

Zhao, "IAM Policies and Bucket Policies and ACLs! Oh, My! (Controlling Access to S3 Resources)", Amazon, AWS Security Blog, Nov. 19, 2013, 6 pages. https://aws.amazon.com/blogs/security/iam-policies-and-bucket-policies-and-acls-oh-my-controlling-access-to-s3-resources/.

Mell et al., "The NIST Definition of Cloud Computing", Recommendations of the National Institute of Standards and Technology, Special Publication 800-145, Sep. 2011, 7 pages.

IBM, "IBM Spectrum Scale—Performance and simplicity for the hybrid cloud", Systems Hardware Data Sheet, downloaded from the Internet on Aug. 17, 2022, 11 pages, <https://www.ibm.com/downloads/cas/GQN4XN15>.

IBM, "Installing IBM Spectrum Scale management GUI by using spectrumscale installation toolkit", downloaded from the Internet on Aug. 17, 2022, 2 pages, <https://www.ibm.com/support/knowledgecenter/en/STXKQY_4.2.1/com.ibm.spectrum.scale.v4r21.doc/bl1ins_intallationofmanagementinterface.htm>.

* cited by examiner

MANAGEMENT OF ACCESS CONTROL IN MULTI-CLOUD ENVIRONMENTS

BACKGROUND

The present disclosure relates to cloud computing, and, more specifically, to improved access control in a cloud computing environment.

Cloud object storage (or object storage) provides a large pool of storage capacity to cloud users. Object storage can make it possible to store an essentially limitless amount of data in a cost-effective manner. Object storage can be used for data archiving, data backup, web and mobile applications, and scalable persistent storage for analytics.

SUMMARY

Disclosed is a computer-implemented method to control access to data on an off-premises storage system. The method includes defining an access policy for a plurality of files in a file system stored in an on-premises storage system. The method further includes registering the access policy with a first off-premises storage system. The method also includes creating a resource-based cloud access policy based on an on-premise access policy. The method includes determining a set of files from the plurality of files to migrate to the off-premises storage. The method also includes obtaining, for the set of files, an access policy as access metadata. The method further includes migrating the set of files and the access metadata to the off-premises storage. Further aspects of the present disclosure are directed to systems and computer program products containing functionality consistent with the method described above.

The present Summary is not intended to illustrate each aspect of, every implementation of, and/or every embodiment of the present disclosure.

BRIEF DESCRIPTION OF THE DRAWINGS

Various embodiments are described herein with reference to different subject-matter. In particular, some embodiments may be described with reference to methods, whereas other embodiments may be described with reference to apparatuses and systems. However, a person skilled in the art will gather from the above and the following description that, unless otherwise notified, in addition to any combination of features belonging to one type of subject-matter, also any combination between features relating to different subject-matter, in particular, between features of the methods, and features of the apparatuses and systems, are considered as to be disclosed within this document.

The aspects defined above, and further aspects disclosed herein, are apparent from the examples of one or more embodiments to be described hereinafter and are explained with reference to the examples of the one or more embodiments, but to which the invention is not limited. Various embodiments are described, by way of example only, and with reference to the following drawings.

DETAILED DESCRIPTION

Figure 1:
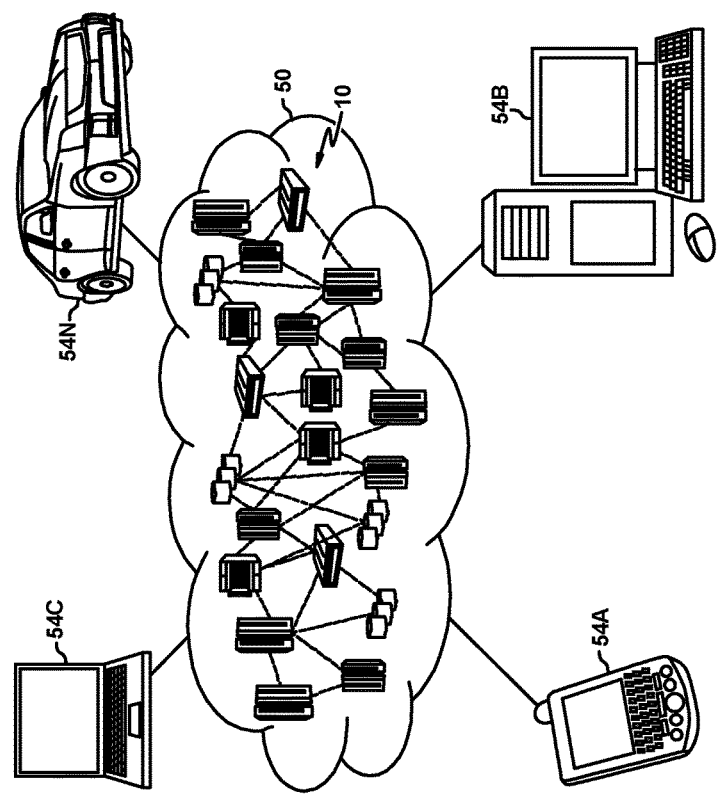
FIG. 1 depicts a cloud computing environment according to an embodiment of the present invention.

The present disclosure relates to cloud computing, and, more specifically, to improved access control in cloud computing environment.

Cloud object storage (or object storage) provides a large pool of storage capacity to cloud users. Object storage can make it possible to store an essentially limitless amount of data in a cost-effective manner. Object storage can be used for data archiving, data backup, web and mobile applications, and scalable persistent storage for analytics.

Cloud Computing in General

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and personal digital assistants (PDAs)).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
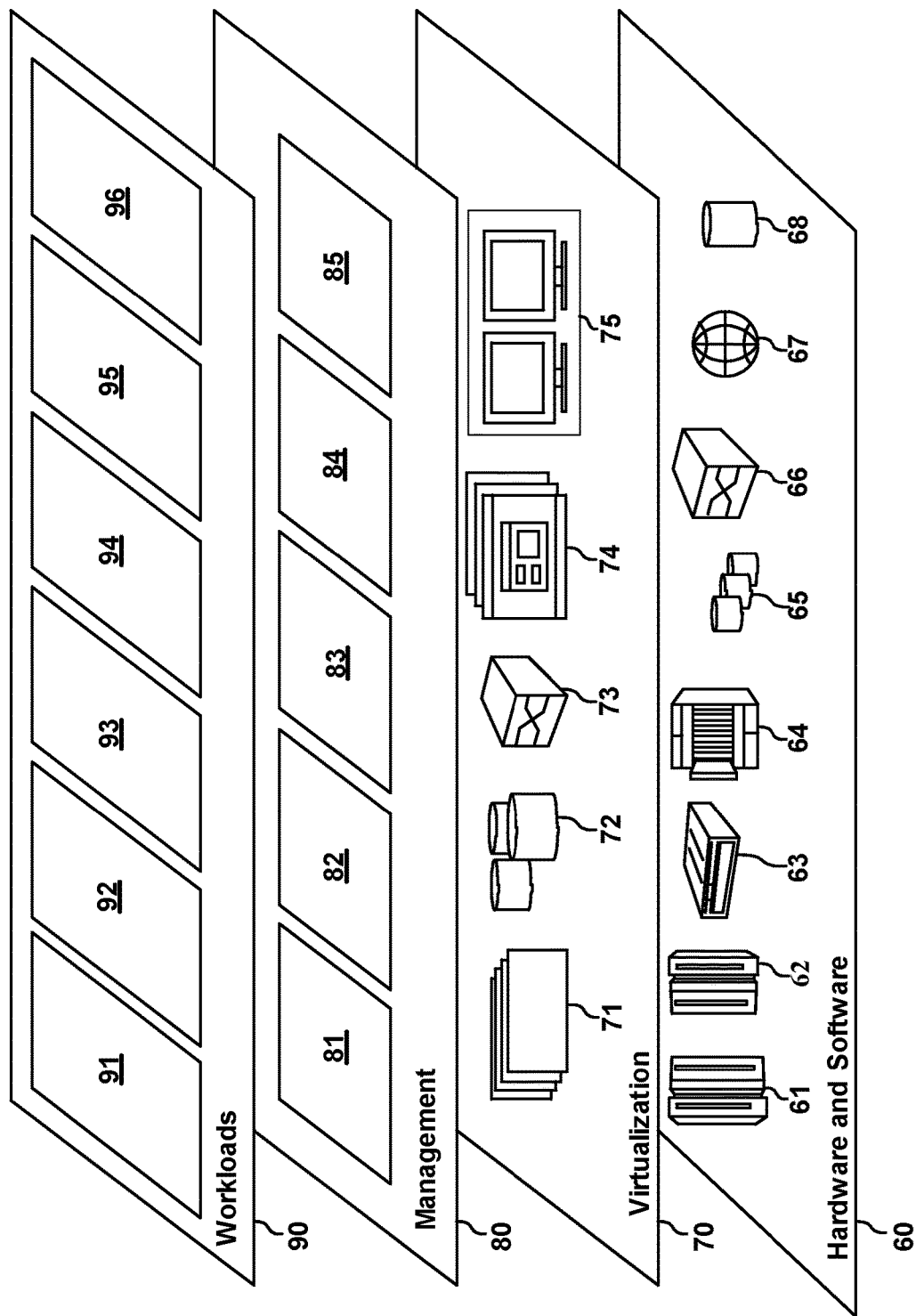
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and application specific processing 96.

Data Processing System in General

Figure 3:
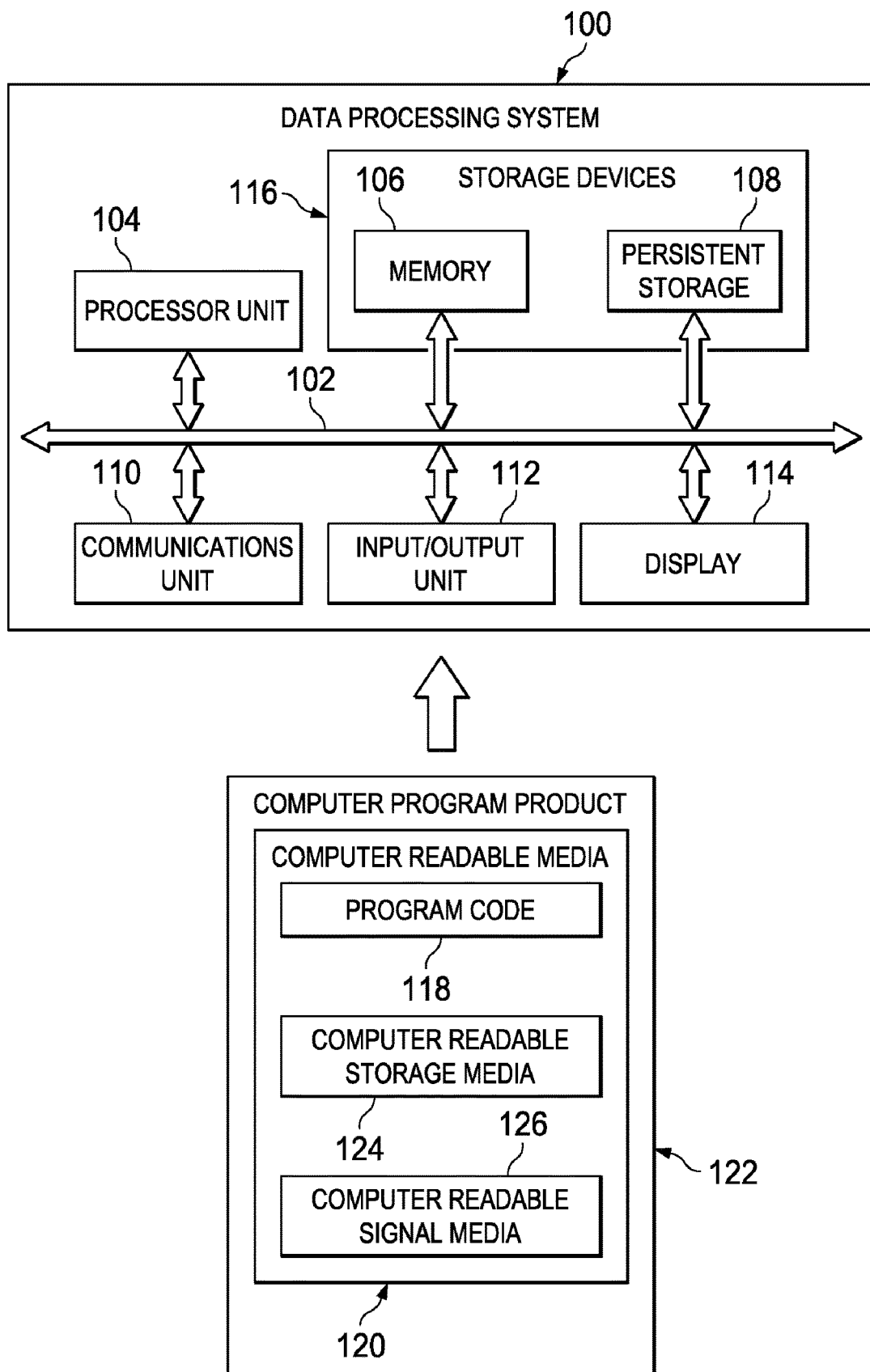
FIG. 3 is a block diagram of a DPS according to one or more embodiments disclosed herein.

FIG. 3 is a block diagram of an example data processing system (DPS) according to one or more embodiments. The DPS may be used as a cloud computing node 10. In this illustrative example, the DPS 100 may include communications bus 102, which may provide communications between a processor unit 104, a memory 106, persistent storage 108, a communications unit 110, an Input/Output (I/O) unit 112, and a display 114.

The processor unit 104 serves to execute instructions for software that may be loaded into the memory 106. The processor unit 104 may be a number of processors, a multi-core processor, or some other type of processor, depending on the particular implementation. A number, as used herein with reference to an item, means one or more items. Further, the processor unit 104 may be implemented using a number of heterogeneous processor systems in which a main processor is present with secondary processors on a single chip. As another illustrative example, the processor unit 104 may be a symmetric multi-processor system containing multiple processors of the same type.

The memory 106 and persistent storage 108 are examples of storage devices 116. A storage device may be any piece of hardware that is capable of storing information, such as, for example without limitation, data, program code in functional form, and/or other suitable information either on a temporary basis and/or a permanent basis. The memory 106, in these examples, may be, for example, a random access memory or any other suitable volatile or non-volatile storage device. The persistent storage 108 may take various forms depending on the particular implementation.

For example, the persistent storage 108 may contain one or more components or devices. For example, the persistent storage 108 may be a hard drive, a flash memory, a rewritable optical disk, a rewritable magnetic tape, or some combination of the above. The media used by the persistent storage 108 also may be removable. For example, a removable hard drive may be used for the persistent storage 108.

The communications unit 110 in these examples may provide for communications with other DPSs or devices. In these examples, the communications unit 110 is a network interface card. The communications unit 110 may provide communications through the use of either or both physical and wireless communications links.

The input/output unit 112 may allow for input and output of data with other devices that may be connected to the DPS 100. For example, the input/output unit 112 may provide a connection for user input through a keyboard, a mouse, and/or some other suitable input device. Further, the input/output unit 112 may send output to a printer. The display 114 may provide a mechanism to display information to a user.

Instructions for the operating system, applications and/or programs may be located in the storage devices 116, which are in communication with the processor unit 104 through the communications bus 102. In these illustrative examples, the instructions are in a functional form on the persistent storage 108. These instructions may be loaded into the memory 106 for execution by the processor unit 104. The processes of the different embodiments may be performed by the processor unit 104 using computer implemented instructions, which may be located in a memory, such as the memory 106.

These instructions are referred to as program code, computer usable program code, or computer readable program code that may be read and executed by a processor in the processor unit 104. The program code in the different embodiments may be embodied on different physical or tangible computer readable media, such as the memory 106 or the persistent storage 108.

The program code 118 may be located in a functional form on the computer readable media 120 that is selectively removable and may be loaded onto or transferred to the DPS 100 for execution by the processor unit 104. The program code 118 and computer readable media 120 may form a computer program product 122 in these examples. In one example, the computer readable media 120 may be computer readable storage media 124 or computer readable signal media 126. Computer readable storage media 124 may include, for example, an optical or magnetic disk that is inserted or placed into a drive or other device that is part of the persistent storage 108 for transfer onto a storage device, such as a hard drive, that is part of the persistent storage 108. The computer readable storage media 124 also may take the form of a persistent storage, such as a hard drive, a thumb drive, or a flash memory, that is connected to the DPS 100. In some instances, the computer readable storage media 124 may not be removable from the DPS 100.

Alternatively, the program code 118 may be transferred to the DPS 100 using the computer readable signal media 126. The computer readable signal media 126 may be, for example, a propagated data signal containing the program code 118. For example, the computer readable signal media 126 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, the program code 118 may be downloaded over a network to the persistent storage 108 from another device or DPS through the computer readable signal media 126 for use within the DPS 100. For instance, program code stored in a computer readable storage medium in a server DPS may be downloaded over a network from the server to the DPS 100. The DPS providing the program code 118 may be a server computer, a client computer, or some other device capable of storing and transmitting the program code 118.

The different components illustrated for the DPS 100 are not meant to provide architectural limitations to the manner in which different embodiments may be implemented. The different illustrative embodiments may be implemented in a DPS including components in addition to or in place of those illustrated for the DPS 100. Other components shown in FIG. 1

The present disclosure relates to cloud computing, and, more specifically, to improved access control in cloud computing environment.

Cloud object storage (or object storage) provides a large pool of storage capacity to cloud users. Object storage can make it possible to store an essentially limitless amount of data in a cost-effective manner. Object storage can be used for data archiving, data backup, web and mobile applications, and scalable persistent storage for analytics.

In a hybrid multi-cloud environment, the traditional control methods (e.g., firewalls) can be less effective and/or ineffective. In hybrid-multi cloud environments, data can be automatically and/or manually migrated between the various databanks in the cloud system. At times, after the migration, the data may reside on a data store over which the data owner does have access control. Also, the operator of the data store may have access to the data and the data owner with no control over access control and/or other security parameters. The data owner, generally, may only have the ability to control access to data that resides in on-premises storage. A cloud user has the privilege to access the data in the cloud based on the domain level authorities. A domain contains many cloud users and a single domain authority. If the cloud user has domain authority privilege, he will be able to access any files in the cloud, even if the data owner does not want the data to be accessed. For example, patient data (e.g., X-Rays) can be subject to several layers of regulation (e.g., laws, corporate rules, etc.). Access may need to be limited to accounts related to the medical organization that created the data.

Limiting the type of data that can be transferred can greatly diminish the effectiveness of the hybrid cloud systems. Additionally, allowing any data to be transferred/migrated with no access control can potentially open the data owner/data producer to civil and/or criminal penalties. Alternatively, establishing proper access/security controls on hybrid cloud systems can be time consuming, costly, impractical, and/or not allowed.

Embodiments of the present disclosure can provide a relatively efficient access control mechanism for hybrid cloud system through application specific processing. Embodiments of the present disclosure can include an access control manager. The access control manager can be configured to identify access control for data in a data system. The identification can include gathering metadata that can be used to provide access control on a different storage location (e.g., after data is migrated in a hybrid cloud).

Embodiments of the present disclosure can use an information lifecycle management (ILM) policy to define metadata information on objects based on an access control list (ACL) defined on files before sending/migrating the files to an off-premises storage system. An off-premises storage can be any storage system separate from an on-premises storage, such as a private or a public cloud.

Embodiments of the present disclosure can register, create and/or update resource-based policy, such as an ACL. The registration can be based on an ILM policy and metadata information. The metadata information can include labels/filters such as "owner", "group", "user", and/or other similar labels. Embodiments of the present disclosure can control off-premises access to the a file system. The access control can be based on resource-based policy and the labels on the metadata. In some embodiments, access to the data on off-site premises is granted or denied based on the request data matching the labels on the metadata.

The aforementioned advantages are example advantages, and embodiments exist that can contain all, some, or none of the aforementioned advantages while remaining within the spirit and scope of the present disclosure.

Figure 4:
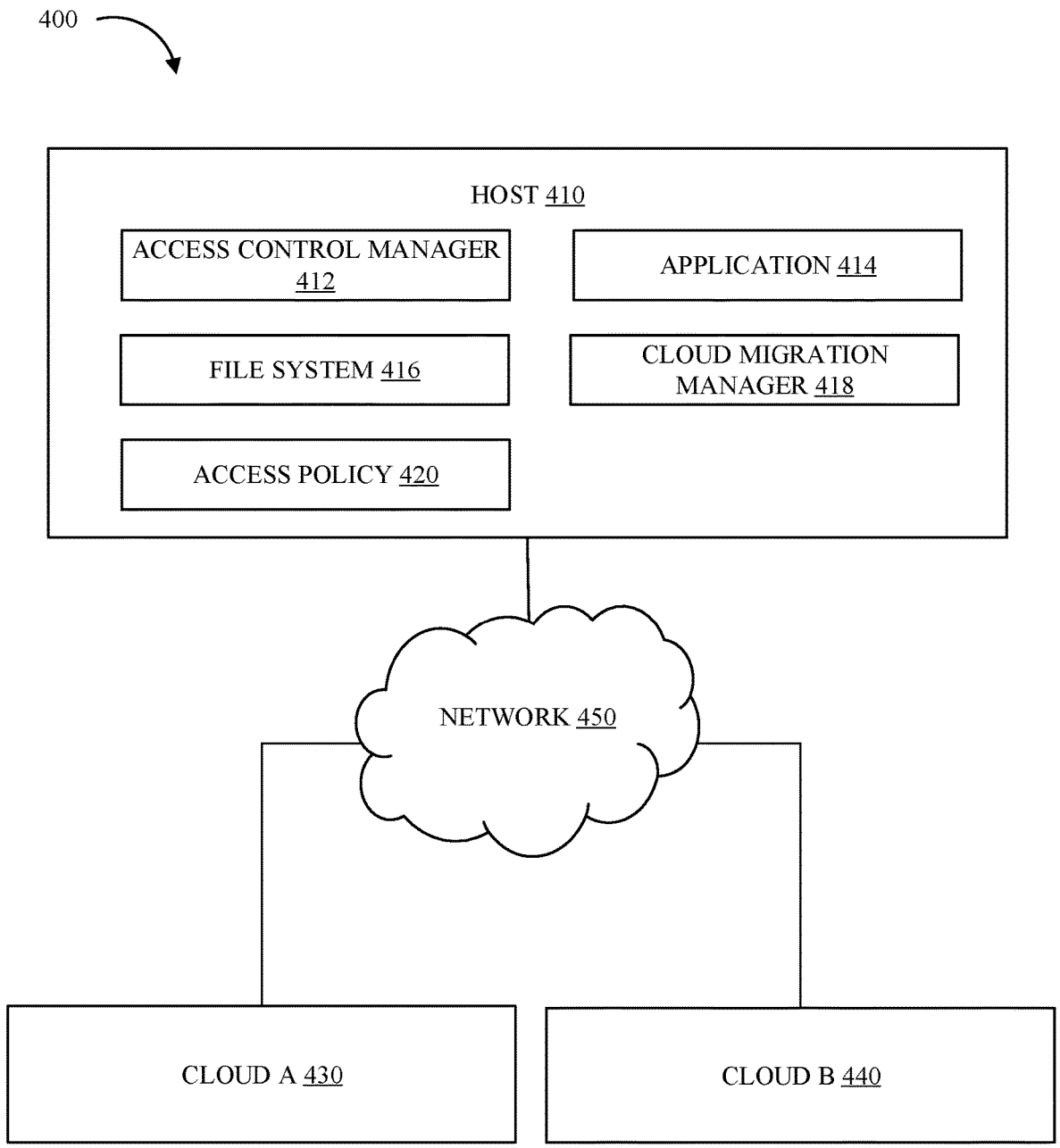
FIG. 4 illustrates a functional diagram of a computing environment suitable for operation of an access control manager in accordance with some embodiments of the present disclosure.

Referring now to various embodiments of the disclosure in more detail, FIG. 4 is a representation of a computing environment 400 that is capable of running an access control manager in accordance with one or more embodiments of the present disclosure. Many modifications to the depicted environment may be made by those skilled in the art without departing from the scope of the disclosure.

Computing environment 400 includes host 410, cloud A 430, cloud B 440, and network 450. Network 450 can be, for example, a telecommunications network, a local area network (LAN), a wide area network (WAN), such as the Internet, or a combination of the three, and can include wired, wireless, or fiber optic connections. Network 450 may include one or more wired and/or wireless networks that are capable of receiving and transmitting data, voice, and/or video signals, including multimedia signals that include voice, data, and video information. In general, network 450 may be any combination of connections and protocols that will support communications between and among host 410, cloud A 430, cloud B 440, and other computing devices (not shown) within computing environment 400. In some embodiments, host 410, cloud A 430, and cloud B 440 may include one or more computer systems, such as the data processing system 100 of FIG. 3. In some embodiments, computing environment 400 can be included in a cloud computing environment such as cloud computing environment 50.

Host 410 can be a standalone computing device, a management server, a web server, a mobile computing device, or any other electronic device or computing system capable of receiving, sending, and processing data. In other embodiments, host 410 can represent a server computing system utilizing multiple computers as a server system, such as in a cloud computing environment (e.g., cloud computing environment 50). In some embodiments, host 410 includes access control manager 412, application 414, file system 416, cloud migration manager 418, and access policy 420.

Access control manager 412 can be any combination of hardware and/or software configured to provide access control for data in a cloud computing environment (e.g., cloud computing environment 50, computing environment 400, etc.). In some embodiments, access control manager 412 can include application 414, file system 416, cloud migration manager 418, and/or access policy 420, however for description purposes, these are being shown separately.

In some embodiments, access control manager 412 generates/defines information life cycle management (ILM) policies. In some embodiments, access control manager 412 uses an ACL. The ILM and/or ACL can define which user accounts can access which files. The ILM and ACL can also define the level of access to the files. In some embodiments, access control manager 412 can migrate files from an on-premises storage to an off-premises storage. The off-premises storage can be a cloud computing system.

Application 414 can be any combination of hardware and/or software configured to carry out a function on a computing device (e.g., host 410). In some embodiments, application 414 is a web application. In some embodiments, application 414 can represent any number of separate applications. In some embodiments, application 414 can be operating within a cloud computing environment. In some embodiments, the ACL and/or ILM policy can be based on the application.

File system 416 can be any combination of hardware and/or software configured to determine/control how data is stored and/or retrieved. File system 416 can store a plurality of files. In some embodiments, the files are stored in an on-premises storage system. On-premises can refer to a specific location, such as the location where host 410 is located. In some embodiments, file system 416 can be replicated/transferred in full or in part across one or more remote storage systems. The remote storage systems can be part of a hybrid cloud environment.

Cloud migration manager 418 can be any combination of hardware and/or software configured to manage data in the cloud computing system. In some embodiments, the cloud computing system can be a hybrid multi cloud system. In some embodiments, cloud migration manager 418 can transfer/replicate data from the onsite storage to one or more cloud systems. The transfers can be based on a set of predetermined rules. For example, if a file is not accessed in a predefined period of time, it may be automatically transferred to a cloud storage system. The transfer can be automatic and/or in response to an initiation, trigger, or according to some rule(s) in some embodiments.

Access policy 420 can be any combination of hardware and/or software configured to control access and/or actions on documents in a file system (e.g., file system 416). In some embodiments, access policy 420 includes an ACL. An ACL is a list of permissions for a file and/or each file in the file system. The ACL can specify which users or systems are granted access to files, as well as what operations (e.g., read only, write, etc.) are allowed on each file. In some embodiments, each entry in the ACL includes a file, a subject (e.g., user, department, organization, etc.), and an operation.

Cloud A 430 can be any combination of hardware and/or software configured to store, manage, and otherwise process data. Cloud A 430 can be consistent with a public cloud, a private cloud and/or community cloud as described in FIGS. 1 and 2.

Cloud B 440 can be consistent with cloud A 430. In some embodiments, cloud B 440 can be managed by a different organization than cloud A 430. The organization can be different departments within a company, separate legal entities, and/or other similar groupings. In some embodiments, computing environment 400 can include one or more additional cloud systems consistent with cloud A 430 and cloud B 440.

Figure 5:
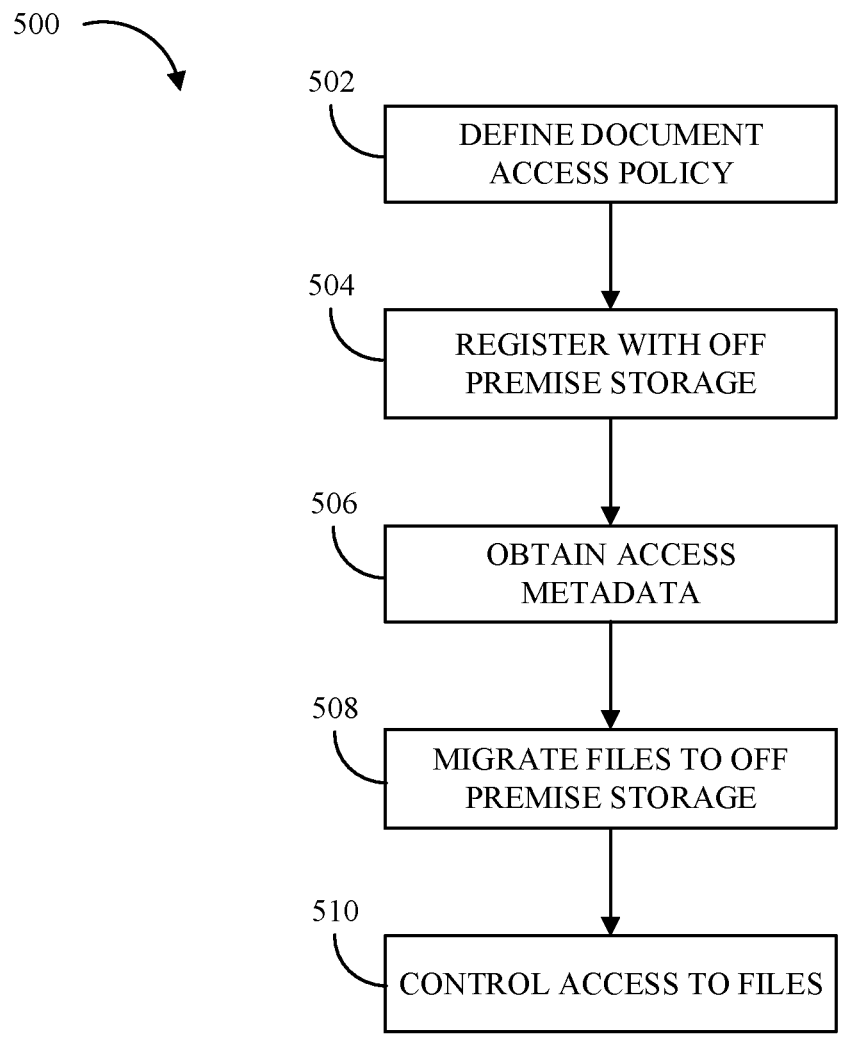
FIG. 5 illustrates a flow chart of an example method to provide access control in off-premises storage, in accordance with some embodiments of the present disclosure.

FIG. 5 depicts a flowchart of an example method, method 500, for access control in an off-premises storage that can be performed in a computing environment (e.g., computing environment 400 and/or cloud computing environment 50). One or more of the advantages and improvements described above for access control in an off-premises storage system may be realized by method 500, consistent with various embodiments of the present disclosure.

Method 500 can be implemented by one or more processors, host 410, access control manager 412, application 414, file system 416, cloud migration manager 418, access policy 420, cloud A 430, cloud B 440, and/or a different combination of hardware and/or software. In various embodiments, the various operations of method 500 are performed by one or more of host 410, access control manager 412, application 414, file system 416, cloud migration manager 418, access policy 420, cloud A 430, cloud B 440. For illustrative purposes, the method 500 will be described as being performed by access control manager 412.

At operation 502, access control manager 412 defines a document access policy. In some embodiments, the document access policy can include a predefined ILM. In some embodiments, the document access policy can include an ACL. In some embodiments, the ACL defines users and/or groups that have access to one or more documents in a file system. The access can be based on a user account and/or a designation within the user account. For example, access can be granted to all user accounts that are part of division A in a corporation. In some embodiments, the access policy can be applied to data that is transferred/migrated to cloud system. In some embodiments, the access policy is associated with one or more applications.

At operation 504, access control manager 412 registers with an off-premises storage (e.g., cloud A 430, cloud B 440, etc.). In some embodiments, the off-premises storage can be a private cloud, a public cloud, and/or a hybrid cloud (e.g., cloud system A 430). In some embodiments, the registration can be based on one or more applications. For example, each application can register individually with each cloud system. The registration can ensure the application (ILM) can adequately access the cloud system to manage policies on the cloud system. In some embodiments, APIs are used to register and/or manage the policies on the cloud system (or off-premises storage). In some embodiments, the registration can allow access control manager 412 to update and/or delete data in the off-premises system. This can be based on changes made in the on-premises ACL.

At operation 506, access control manager 412 generates/obtains access metadata (or metadata) for the document access policy. In some embodiments, the metadata is obtained from the files. In some embodiments, the metadata is obtained from the ACL. In some embodiments, the amount and/or type of metadata is based on the configuration of the file system. The configuration can include the operating system requirements. In some embodiments, the metadata includes a resource (e.g., a file), and a user. The metadata can also include one or more of a group, a user, a bucket, a token, a domain, and the like. For example, if the system is POSIX based, access metadata can include defining a user with another group designation. In another example, if the system is SELinux, then access can be based on a user and a role (e.g., object_r). In a third example, if the system is NSFv4, then access can be based on an ace principle (e.g., user@nfsdomain.org) and with a specified ace flag.

In some embodiments, operation 506 includes determining a set of files to migrate to one or more off-premises storage systems. Obtaining the access metadata can be in response to the determination of files to migrated. In some embodiments, the determination is made by migration manager 418. In some embodiments, a file can be migrated to two or more off-premises storage systems at one time.

At operation 508, access control manager 412 migrates one or more files to one or more off-premises storage systems (e.g., cloud system A 430, etc.). In some embodiments, metadata for access control is migrated with the files. In some embodiments, the metadata can be added to each file. In some embodiments, all the ACLs can be sent as separate metadata.

At operation 510, access control manager 412 controls access to the migrated files. In some embodiments, the control includes allowing or denying access requests from a cloud user. In some embodiments, controlling access can be based on the migrated metadata and/or the ACL. In some embodiments, the control includes allowing access to files (or to a particular file) in response to determining the access rule is satisfied. In some embodiments, the control includes denying access in response to determining the access rule is not satisfied. The access rule can be satisfied or not satisfied can be based on the source of the access request matching the access metadata.

Figure 6:
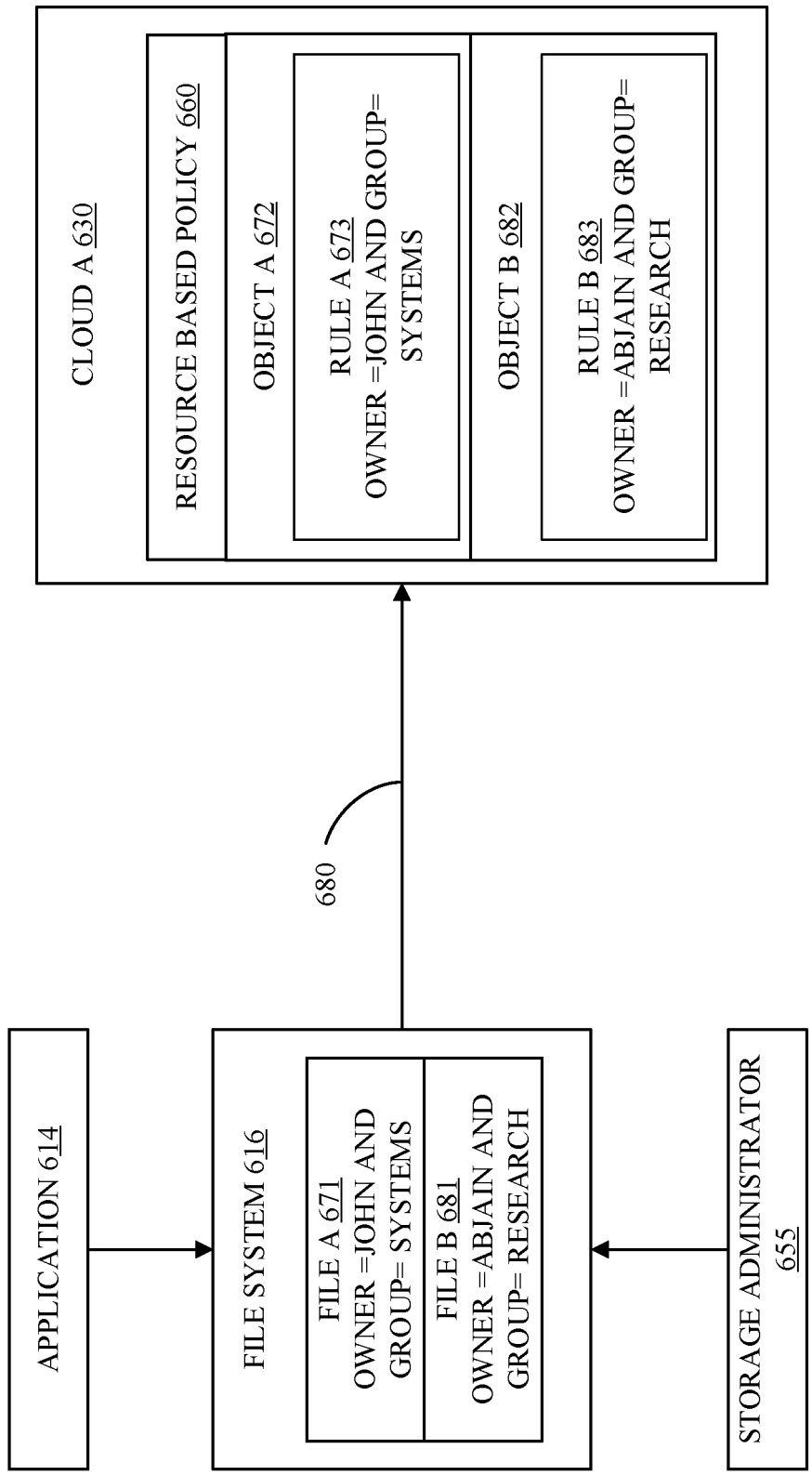
FIG. 6 illustrates a functional diagram of a computing environment suitable for operation of an access control manager in accordance with some embodiments of the present disclosure.

Referring now to various embodiments of the disclosure in more detail, FIG. 6 is a representation of a computing environment 600, that is capable of running an access control manager in accordance with one or more embodiments of the present disclosure. Many modifications to the depicted environment may be made by those skilled in the art without departing from the scope of the disclosure.

FIG. 6 is one embodiment of how access control manager 412 can improve access control in remote cloud system. The components in FIG. 6 can be consistent with those in computing environment 600.

Storage administrator 655 can be a source for the access policy (e.g., access policy 420, ACL) for file system 616, where file system 616 can be consistent with file system 416. In some embodiments, storage administrator can be a computing device that receives data from one or more users. In some embodiments, storage administrator 655 can send updates for the access policy.

Application 614 can be consistent with application 414. Application 614 can be configured to use (open, write, access, update, etc.) one or more files in file system 616. The operations of application 614 can access the files of file system 614 if a user associated with the application request meets the rules defined by storage administrator 655.

In some embodiments, file system 616 includes two files, file A 671 and file B 681. File A 671 and File B 681 can be any type of file of any format (e.g., word file, spreadsheet, photo, etc.). Application 614 can send an access request related to file A 671 and file B 681 and access can be granted based on the policy received from storage administrator 655.

A communication link 680 may be used to migrate files from file system 616 to cloud A 630, where cloud A 630 is consistent with cloud A 430. Prior to the migration, the application 614, storage administrator 655 and/or file system 616 can be registered with cloud A 630. The migration can include the obtaining of access metadata consistent with operation 506. In some embodiments, resource-based policy 660 can be included in the obtaining of access metadata and/or the migration. After migration, access to file A 671, now stored as object A 672, is controlled by the resource-based policy 660 to access requests that satisfy rule A 673. Access to file B 681, now stored as object B 682, is controlled by the resource-based policy 660 to access requests that satisfy rule B 683. In some embodiments, rule a 673 and/or rule B 683 can be updated while on cloud A 630. In some embodiments, various embodiments computing environment 600 can include any number of file systems, files, storage administrators, rules, objects, cloud systems, and/or migrations. The number shown are for discussion purposes.

Computer Technology and Computer Readable Media

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
defining an access policy for a plurality of files in a file system stored in an on-premises storage system, wherein the access policy is associated with an application;
registering the application with an off-premises storage system, wherein the registering ensures the first off-premises storage system can manage the access policy and the application can access the off-premise storage;
creating, in response to the registering, a resource-based cloud access policy based on an on-premise access policy;
determining a set of files from the plurality of files to migrate to the off-premises storage;
obtaining, for the set of files, the resource-based cloud access policy as access metadata; and
migrating, in response to the obtaining and the registering, the set of files and the access metadata to the off-premises storage with the resource-based cloud access policy, wherein the resource-based cloud access policy is configured to control access, based on the access metadata, to the set of files on the off-premises storage.

2. The method of claim 1, wherein the resource-based access policy is further configured to manage an access request for the set of files at the off-premises storage system.

3. The method of claim 2, wherein the controlling includes denying access to the first file based on account data from the access request not matching the access metadata for the first file.

4. The method of claim 2, wherein the controlling includes allowing access to the first file based on account data of the access request matching the access metadata for the first file.

5. The method of claim 1, wherein the access metadata includes, for each file of the set of files, a file identifier, an account, a group identifier, and an access level.

6. The method of claim 1, wherein the access policy is based on an access control list (ACL).

7. The method of claim 6, wherein the access policy is based on information lifecycle management (ILM) policy created resource access cloud policy.

8. The method of claim 1, further comprising:
registering, the access policy with a second off-premises storage system; and
migrating a second set of files from the plurality of files and a second set of access metadata for the seconds set of files to the second off-premises storage system.

9. The method of claim 8, wherein the on-premises storage system, first off-premises storage system, and the second off-premises storage system are included in a hybrid multi cloud system.

10. The method of claim 1, wherein an owner of the plurality of files does not have domain level access control on the off-premises storage.

11. The method of claim 10, wherein the resource-based cloud access policy prevents an operator of the off-premises storage with the domain level access control from accessing the set of files.

12. The method of claim 1, wherein the set of files are stored as objects on the off-premises storage system.

13. A system comprising:
a processor; and
a computer-readable storage medium communicatively coupled to the processor and storing program instructions which, when executed by the processor, are configured to cause the processor to:
define an access policy for a plurality of files in a file system stored in an on-premises storage system, wherein the access policy is associated with an application;
register the application with an off-premises storage system, wherein the registering ensures the first off-premises storage system can manage the access policy and the application can access the off-premise storage;
create, in response to the registering, a resource-based cloud access policy based on an on-premise access policy;
determine a set of files from the plurality of files to migrate to the off-premises storage;
obtain, for the set of files, the resource-based cloud access policy as access metadata; and
migrate, in response to the obtaining and the registration, the set of files and the access metadata to the off-premises storage with the resource-based cloud access policy, wherein the resource-based cloud access policy is configured to control access, based on the access metadata, to the set of files on the off-premises storage.

14. The system of claim 13, wherein the resource-based access policy is further configured to manager an access request for the set of files at the off-premises storage system.

15. The system of claim 14, wherein the controlling includes allowing access to the first file based on account data of the access request matching the access metadata for the first file.

16. The system of claim 13, wherein the access metadata includes, for each file of the set of files, a file identifier, an account, a group identifier, and an access level.

17. A computer program product, the computer program product comprising a computer readable storage medium having program instructions embodied therewith, the program instructions executable by a processing unit to cause the processing unit to:

define an access policy for a plurality of files in a file system stored in an on-premises storage system, wherein the access policy is associated with an application;

register the application with an off-premises storage system, wherein the registering ensures the first off-premises storage system can manage the access policy and the application can access the off-premise storage;

create, in response to the registering, a resource-based cloud access policy based on an on-premise access policy;

determine a set of files from the plurality of files to migrate to the off-premises storage;

obtain, for the set of files, the resource-based cloud access policy as access metadata; and migrate, in response to the obtaining and the registration, the set of files and the access metadata to the off-premises storage with the resource-based cloud access policy, wherein the resource-based cloud access policy is configured to control access, based on the access metadata, to the set of files on the off-premises storage.

18. The computer program product of claim 17, wherein the resource-based access policy is further configured to manager an access request for the set of files at the off-premises storage system.

19. The computer program product of claim 18, wherein the controlling includes denying access to the first file based on account data from the access request not matching the access metadata for the first file.

20. The computer program product of claim 17, wherein the access metadata includes, for each file of the set of files, a file identifier, an account, a group identifier, and an access level.

\* \* \* \* \*